United States Patent [19]

Grigo et al.

[11] Patent Number: 4,472,554

[45] Date of Patent: Sep. 18, 1984

[54] POLYCARBONATE ABS BLENDS OF IMPROVED IMPACT STRENGTH

[75] Inventors: Ulrich R. Grigo, New Martinsville, W. Va.; Nelson R. Lazear, McMurray, Pa.; Mark W. Witman, New Martinsville, W. Va.

[73] Assignee: Mobay Chemical Corporation, Pittsburgh, Pa.

[21] Appl. No.: 401,807

[22] Filed: Jul. 26, 1982

[51] Int. Cl.$^3$ ............... C08L 55/02; C08L 69/00
[52] U.S. Cl. ................................ 525/67; 525/74; 525/78
[58] Field of Search ...................... 525/67, 78

[56] References Cited

U.S. PATENT DOCUMENTS

| | | | |
|---|---|---|---|
| 3,130,177 | 4/1964 | Grabowski | 260/45.5 |
| 3,162,695 | 12/1964 | Grabowski | 260/873 |
| 3,951,903 | 4/1976 | Shaffer | 260/37 PC |
| 4,205,141 | 5/1980 | Liebig et al. | 525/67 |
| 4,226,950 | 10/1980 | Holub et al. | 525/67 |
| 4,297,446 | 10/1981 | Lindner et al. | 525/66 |
| 4,299,929 | 11/1981 | Sakano et al. | 525/67 |
| 4,302,378 | 11/1981 | Lindner et al. | 260/31.6 |
| 4,367,310 | 1/1983 | Henton | 525/67 |

FOREIGN PATENT DOCUMENTS 55-157648 12/1980 Japan ...................... 525/67

Primary Examiner—Wilbert J. Briggs
Attorney, Agent, or Firm—Gene Harsh; Lawrence S. Pope; Aron Preis

[57] ABSTRACT

A thermoplastic molding composition is described comprising a blend of a polycarbonate, a certain graft polymer and polymeric acidifying agent which composition is characterized by its improved stability and impact strength.

6 Claims, No Drawings

POLYCARBONATE ABS BLENDS OF IMPROVED IMPACT STRENGTH

FIELD OF THE INVENTION

The present invention is directed to polymer blends and, more particularly, to blends of polycarbonate and certain graft polymers.

SUMMARY OF THE INVENTION

The invention is predicated on the surprising and unexpected findings that blends of polycarbonate and certain graft copolymers are imparted improved stability and impact strength upon the admixing of small amounts of at least one polymeric acidifying agent.

BACKGROUND OF THE INVENTION

Graft copolymers prepared by polymerizing vinyl aromatic and acrylonitrile monomers in the presence of a butadiene-based latex are tough, rigid resins which utility has been somewhat limited because of their relatively low heat distortion temperature.

Polyblends of graft copolymers and polycarbonate have been disclosed in U.S. Pat. Nos. 3,162,695 and 3,130,177. The art is further noted to include U.S. Pat. No. 4,302,378 disclosing ABS molding compositions to which added are small quantities of perfluoroalkane acids which compositions are characterized by their improved impact strength. Similarly, the ABS molding composition of U.S. Pat. No. 4,297,446 is noted to exhibit an improved level of impact strength upon the incorporation of small amounts of a silicourethane derivative therewith.

The art is noted to include U.S. Pat. No. 3,951,903 wherein disclosed are modified polycarbonate resins rendered improved physical properties and resistance to stress cracking by blending therewith an acidifying agent.

U.S. Pat. No. 4,226,950 discloses a composition comprising polycarbonate resins, a certain polyester, a polyolefinic additive and an acrylic rubber impact modifying agent. Butadiene grafts are noted among the acrylic rubber impact modifying agents and ethylene acrylic acid copolymers are noted among the polyolefin copolymers mentioned therein.

DETAILED DESCRIPTION OF THE INVENTION

1. The Polycarbonates

In the present context, polycarbonate resins may have a molecular weight (weight average) of about 10,000 to about 200,000, preferably about 20,000 to about 80,000, and may have a melt flow rate per ASTM D-128 at 300° C., of about 1 to about 24 gm/10 minutes, preferably about 2–6 gm/10 minutes.

In the present context, bisphenols suitable for the preparation of the polycarbonates of the invention conform to the structural formulae (1) or (2)

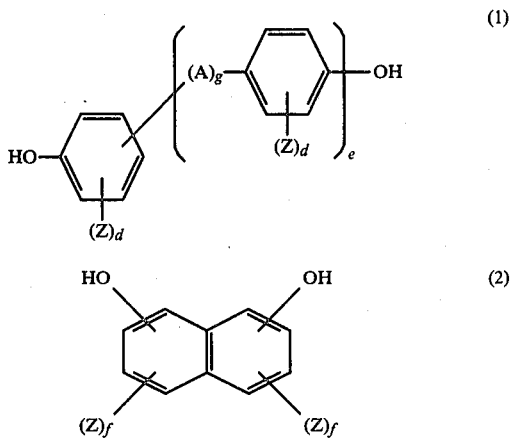

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, any oxygen atom, an —SO— or —SO$_2$— radical; a radical of the general formula

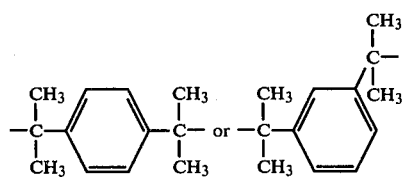

g denotes the number 0 or 1;

e denotes the number 0 or 1;

Z denotes F, Cl, Br or a C$_1$–C$_2$ alkyl and if several Z radicals are substituents in one aryl radical, they may be identical or different;

D denotes 0 or an integer of from 1 to 4; and f denotes 0 or an integer of from 1 to 3.

Among the useful bisphenols in the practice of the invention are hydroquinone, resorcinol, bis-(hydroxyphenyl)-alkanes, bis(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, *Chemistry and Physics of Polycarbonates,* Interscience Publishers, New York 1964. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane,α,α-bis-(4-hydroxyphenyl)-p-diisopropylbenzene, 2,2-bis-(3-chloro-4-hydroxyphenyl)-propane, hydroxybenzophenone and 4,4′-sulfonyl diphenol.

The most preferred bisphenol is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification. The suitable processes and the associated reactants, catalysts, solvents and conditions are known in the art and have been described in German Pat. Nos. 1,046,311 and 962,274 and in U.S. Pat. Nos. 3,258,414; 3,153,008; 3,215,668; 3,187,065; 3,028,365; 2,999,846; 2,999,835; 2,964,974; 2,970,137; 3,912,638 and 1,991,273, all incorporated herein by reference.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol % (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-hydroxy-benzoic acid, trimesic acid, cyanuric chloride and 3,3-bis-(4-hydroxyphenyl)-2-oxo-2,3-dihydroindole.

2. The Graft Polymer

In accordance with the present invention, graft polymers are prepared by emulsion polymerization of a vinyl aromatic monomer and at least one monomer selected from among acrylic ester monomers and acrylonitrile monomers in the presence of a polybutadiene rubber or of a dienestyrene copolymer rubber. These graft polymers are further characterized in that brine is employed as an agent in the course of their coagulation in the emulsion. The proportion of rubber is from about 5 to about 80% by weight of the graft.

The graft bases used are, in particular, polybutadiene, butadiene/acrylonitrile and butadiene/styrene polymers and also butadiene/styrene block polymers. It is also possible to use acrylic ester/vinyl ether copolymers and EPDM terpolymers. Graft monomers are primarily mixtures of styrene and acrylonitrile, preferably in a ratio by weight of from 90:10 to 50:50, mixtures of styrene and methyl methacrylate, preferably in a ratio by weight of from 5:95 to 95:5 and mixtures of styrene, acrylonitrile and methylmethacrylate. The production of the graft products is known.

The graft monomers may be emulsion-polymerized in the presence of a latex of the graft base using radical initiators. Where the graft base is pre-crosslinked and providing certain graft monomer/graft base ratios are maintained, the particle size of the latex of the graft base also determines the particle size of the graft polymer. The graft shell, which consists of chains of the polymer of the graft monomers chemically attached to the rubber particles, is relatively thin and does not significantly alter the diameter of the rubber particle. In the context of the invention, "diameter" or "particle size" is understood to be the mean diameter $d_{50}$, i.e., the diameter above which and below which, respectively, the diameters of 50% by weight of the particles lie. The graft reaction is incomplete. In addition to the actual graft polymer, the ungrafted copolymer of the graft monomers is also formed. For this reason, the product of the graft reaction is referred to as the "graft product". According to the invention, it is possible to use graft products of which the particles have a diameter of from 0.05 to 20 microns ($\mu$) a considerable proportion of the graft monomers being included within the rubber particle in the form of homopolymer or copolymer. Particle diameters of from 0.05 to 1.2$\mu$ and from 0.05 to 0.6$\mu$ are preferred. It is also possible to use several different graft products together, for example, two graft products which differ from one another in their degree of grafting, in the size of the rubber particles and/or the graft density. A particularly suitable graft product is, for example, a mixture of a graft product of rubber particles having a $d_{50}$ value of from 0.35 to 10$\mu$ and a graft product of rubber particles having a mean particle diameter of $d_{50}$ of from 0.05 to 0.32$\mu$, i.e., so-called bimodal systems.

The graft products preferably contain from 35 to 80% by weight (more particularly, from 40 to 70% by weight) of rubber, have a mean particle diameter of from 0.1 to 0.5$\mu$ and are used in such a quantity that the molding composition contains from 5 to 25% by weight and preferably from 5 to 20% by weight of rubber (graft base).

The preferred grafting monomeric mixture is selected from the group consisting of styrene-methyl-methacrylate, styrene-methyl methacrylate-acrylonitrile and styrene-acrylonitrile. It will be understood that minor amounts of a crosslinking monomer, for instance, divinyl-benzene ethylene glycol dimethacrylate, or the like, may also be included in the preparation of the graft polymers of the invention.

The emulsion polymerization and the brine coagulation characteristics of the grafts of the present invention are known in the art and are described, for example, in U.S. Pat. No. 3,238,275, the disclosure of which, in this regard, is incorporated by reference herein.

Particularly preferred graft polymers in the present context are characterized in that 5 to 50 parts by weight of a graft product of 40 to 80 parts by weight of polybutadiene and 60 to 20 parts by weight of a styrene-acrylonitrile copolymer produced in its presence with a particle diameter $d_{50}$ of from 0.1 to 0.6 and preferably from 0.25 to 0.5, and other preferred graft polymers consist of 6 to 30 parts by weight of a graft product of 20 to 60 parts by weight of a mixture of styrene and acrylonitrile in a ratio by weight of from 88:12 to 60:40 on 80 to 40 parts by weight of a butadiene homopolymer or copolymer having a butadiene content of at least 70% by weight and a mean particle diameter $d_{50}$ of from 0.26 to 0.65μ; or 14 to 45 parts by weight of a graft product of 60 to 40 parts by weight of a mixture of styrene and acrylonitrile in a ratio by weight of from 80:20 to 60:40 on 40 to 60 parts by weight of a butadiene homopolymer or copolymer having a butadiene content of at least 70% by weight and a mean particle diameter $d_{50}$ of from 0.08 to 0.25.

3. The Acidifying Agents

In the context of the invention the acidifying agents are either polymers, or copolymers of acidic monomers containing any of carboxylic acid, phosphonic acid and sulfonic acid moieties. The amount of acidic moieties ranges from about 0.1 to about 30.0% relative to the weight of the acidifying agent.

Suitable among the acidifying agents are copolymers (weight average molecular weight of between 1000 and 10,000 as measured by light scattering) of any of ethylene/acrylic acid, ethylene/methacrylic acid, styrene/acrylic acid, styrene/methacrylic acid, methylmethacrylate/acrylic acid and grafted copolymers containing acid groups.

Particularly preferred acidifying agents are ethylene copolymers of acrylic acid such as are available under the trade name A-C 540 and A-C 540 A from Allied Chemical Company, Specialty Chemicals Division, Morristown, N.J. 07960. These are characterized in that their softening point, per ASTM E-28 is 226° F., their hardness per ASTM D-5 is 2.0 dmm, their density per ASTM D-1505 is 0.93 gm/cc, their viscosity (cps) at 140° C. (Brookfield) is about 500 and their acid number mgKOH/g is 40. Other similarly available products, termed A-C 580 and A-C 5120 are of a higher acid number and are likewise suitable.

Also suitable as an acidifying agent is Acryloid KR-725, an all acrylic polymer available from Rohm & Haas Company, Philadelphia, Pa.

In the practice of the invention, blends of a polycarbonate resin and a graft polymer at a weight ratio of about 5:95 to 95:5 and preferably from about 10:90 to about 90:10 are stabilized by the addition thereto of sufficient amounts preferably about 0.1 to about 15.0% relative to the weight of the blends of an acidifying agent.

The compositions comprising the blends and acidifying agents of the present invention may be prepared by any of the conventional blending techniques including mechanical mixing of the components in pellet or powder form, by blending on hot rolls or by melt-mixing in a Banbury mixer or through extrusion. The composition may be further compounded to contain antioxidants, stabilizers, lubricants, fillers, plasticizers, pigments, flame retardants, foaming agents and the like, which are added in accordance with conventional procedures well known in the art.

The invention will be further described by the Examples which are provided by way of illustration of the present invention and are not intended to limit the scope thereof.

EXAMPLES

EXAMPLE 1

The compositions according to the invention were prepared and their properties as shown in Table 1.

TABLE 1

|  | A | B | C | D |
|---|---|---|---|---|
| Polycarbonate[1] | 60 | 50 | 60 | 50 |
| ABS[2], pbw | 40 | 50 | 40 | 50 |
| Additives |  |  |  |  |
| Phosphite stabilizer[3] phr | 0.3 | 0.3 | — | — |
| Ethylene-acrylic acid copolymer[4], phr | 2.4 | 1.9 | — | — |
| Impact strength[5] (in-lb) of specimens molded at |  |  |  |  |
| 480° F. | 351 | 333 | 347 | 331 |
| 510° F. | 351 | 331 | 312 | 292 |
| 540° F. | 372 | 349 | 321 | 301 |
| Spiral flow at |  |  |  |  |
| 465° F. | 9 | 14.5 | 12 | 12.5 |
| 510° F. | 17.5 | 19 | 19.5 | 22 |

[1]Merlon M-50 a homopolycarbonate having a melt flow index of about 3–5.9 gm/10 min., available from Mobay Chemical Corporation
[2]A blend of styrene (72%) acrylonitrile (28%) copolymer (SAN) and ABS graft polymer toughner. The graft polymer toughner comprising 50 wt. % SAN grafted on polybutadiene (50 wt %); in Samples A and C the ratio of SAN/toughner is 7/13 and in samples B and D the ratio is 8.75/16.25.
[3]A stabilizer in accordance with DOS 2,929,229.
[4]Ethylene acrylic acid copolymer available under the trade designation AC 540 from Allied Chemical Company, Specialty Chemicals Division, Morristown, New Jersey.
[5]Gardner Drop Impact at room temperature, ⅛".

The compositions were extruded in a 2" single screw extruder having a ratio of 2.75:1 at a temperature profile (r→f,°C.):270, 280, 270, 255, 245, 265, 265.

EXAMPLE 2

Additional compositions in accordance with the invention were prepared and their properties determined as shown in Table 2. The components were tumble blended and the blend extruded (ZSK 53) at a temperature profile (r→f) 260, 240, 225, 220, 225, 220(°C.). These compositions are set in comparison to similar compositions wherein the ABS component is not brine coagulated. Essentially the comparison indicates that the mechanical properties of the compositions of the invention are substantially comparable to the latter yet offer an improved melt index.

|  | A | B | C | D | E[3] | F[3] |
|---|---|---|---|---|---|---|
| Polycarbonate[1] pbw | 45 | 45 | 60 | 60 | 45 | 60 |
| ABS[2], (pbw) | 53 | 53 | 38 | 38 | 55 | 40 |
| Ethylene-acrylic acid copolymer[4] pbw | 2 | 2 | 2 | 2 | — | — |
| Phosphite stabilizer[5], phr | 0.3 | 0.3 | 0.3 | 0.3 | — | — |
| Properties: |  |  |  |  |  |  |
| Melt index[6] (gm/10 min.) | 7.23 | 4.73 | 6.81 | 4.85 | 3.76 | 4.58 |
| Color (525° F.) | light | light | light | light | light brown | light brown |
| Tensile strength |  |  |  |  |  |  |

-continued

|  | A | B | C | D | E[3] | F[3] |
|---|---|---|---|---|---|---|
| (MPa) | | | | | | |
| Yield | 55.94 | 59.80 | 57.36 | 50.91 | 57.41 | 58.84 |
| Ultimate | 43.57 | 52.24 | 46.16 | 43.02 | 45.09 | 47.52 |
| Elongation, % | 3 | 3 | 4 | 5 | 4 | 4 |
| ultimate, | 16 | 20 | 28 | 57 | 11 | 19 |
| Heat distortion temperature | | | | | | |
| @ 264 psi, °C. | 104.1 | 102.7 | 114.3 | 103.2 | 101.9 | 110.2 |
| Impact strength notched Izod ft-lb/in. | | | | | | |
| ⅛" specimens molded at: | | | | | | |
| 450° F. | 12.9 | 16.4 | 15.4 | 11.3 | 11.6 | 12.6 |
| 475° F. | 13.3 | 14.4 | 11.9 | 10.9 | 11.1 | 11.9 |
| 500° F. | 11.0 | 11.0 | 11.5 | 10.9 | 9.2 | 11.3 |
| 525° F. | 10.3 | 9.3 | 10.2 | 10.2 | 8.1 | 9.7 |
| ¼" specimens molded at: | | | | | | |
| 450° F. | 12.8 | 9.5 | 8.2 | 9.4 | 8.7 | 10.0 |
| 475° F. | 9.7 | 9.1 | 8.3 | 9.3 | 8.4 | 9.5 |
| 500° F. | 7.8 | 8.3 | 8.1 | 9.1 | 7.3 | 9.2 |
| 525° F. | 5.5 | 7.0 | 7.6 | 8.2 | 5.2 | 6.5 |

[1] Merlon M-40, a homopolycarbonate having a melt flow index of about 6–11.9 gm/10 min. from Mobay Chemical Corporation.
[2] A blend of styrene (72%) acrylonitrile (28%) (SAN) and an ABS graft polymer toughner. The graft polymer toughner comprises 50 pbw of SAN grafted on polybutadiene (50 wt %). The weight ratio of SAN in the blend to the toughner is 18.6/13.2, 12.0/19.8, 13.2/9.6 and 8.4/14.4 for samples A, B, C and D, respectively.
[3] Blends of Merlon M-50 and ABS (Blendex 206 from Borg-Warner).
[4] Ethylene-acrylic acid copolymer AC 540 A.
[5] A stabilizer in accordance with DOS 2,929,229.
[6] Per ASTM 1238.

EXAMPLE 3

The tables below summarize the results of evaluating compositions according to the invention. The compositions all contained 60% by weight of polycarbonate (Merlon M-40) and 40% by weight of ABS. In all cases, the ABS resin was a blend of an ABS graft polymer toughner comprising 50% SAN grafted on polybutadiene (50%), and styrene (72%) acrylonitrile (28%) copolymer, the ratio in all compositions was 1.6/2.4 (toughner/SAN). In all cases, 2.2 phr (per 100 resin) of the acidifying agent additive indicated were blended with the composition. The preparation of these compositions and the preparation of test specimens therefrom was carried out according to the procedure outlined in Example 1 above.

|  | Control | 3-1 | 3-2 | 3-3 | 3-4 | 3-5 | 3-6 |
|---|---|---|---|---|---|---|---|
| Melt index, gm/10 min. | 4.4 | — | — | 2.68 | 2.36 | 2.28 | 2.38 |
| Heat distortion temperature at 264 psi, °C. | 113.2 | 111.0 | 104.7 | 117.1 | 113.6 | 107.3 | 112.6 |
| Impact strength, ⅛" notched Izod ft-lb/in. specimen molded at | | | | | | | |
| 450° F. | 10.8 | 13.7 | 11.8 | 12.9 | 14.8 | 11.1 | 12.9 |
| 475° F. | 11.1 | 15.0 | 12.6 | 15.1 | 16.6 | 11.9 | 12.9 |
| 500° F. | 11.2 | 11.8 | 11.6 | 14.2 | 14.6 | 11.9 | 13.8 |
| 525° F. | 6.9 | 5.3 | 5.2 | 8.7 | 7.9 | 6.5 | 11.1 |

The corresponding additives were:
3-1: Oxidized homopolymer 629A, an A-C polyethylene from Allied Chemical Company, having an acid number (mg KOH/g) of 16
3-2: Allied 403 an ethylenic vinylacetate copolymer from Allied Chemical Company
3-3: An A-C ethylene, acrylic acid copolymer 580 from Allied Chemical Company, having an acid number of 75 (corresponds to 10% acrylic acid).
3-4: An ethylene, acrylic acid copolymer A-C 540, from Allied Chemical Company having an acid number of about 40 (corresponding to about 5% acrylic acid).
3-5: A styrene maleic anhydride copolymer.
3-6: Acryloid KR 725 from Rohm & Haas, an all acrylic polymeric modifier.

EXAMPLE 4

The procedure for the preparation of the compositions of Example 4 was outlined above in Example 3. In Examples 4–5, making use of an ABS that is not brine coagulated demonstrates that the properties of the composition in accordance with the invention are comparable thereto.

|  | 4-1 | 4-2 | 4-3 | 4-4 | 4-5 |
|---|---|---|---|---|---|
| Polycarbonate[1] | 65 | 65 | 65 | 65 | 65 |
| ABS[2] | 35 | 35 | 35 | 35 | 35[3] |
| Phosphite stabilizer[4], phr | — | 0.33 | — | 0.33 | — |
| Ethylene acrylic acid copolymer[5] phr | — | — | 2.2 | 2.2 | — |
| Melt index gm/10 min. | 7.2 | 5.37 | 3.93 | 4.15 | 11.4 |
| Heat distortion temp. at 264 psi, °C. | 114.6 | 115.7 | 116.2 | 112.9 | 113.9 |
| Impact strength, lb-ft/in. | | | | | |
| notched Izod, ⅛" specimens molded at | | | | | |
| 450° F. | 10.9 | 12.3 | 3.2 | 14.7 | 14.0 |

-continued

|  | 4-1 | 4-2 | 4-3 | 4-4 | 4-5 |
|---|---|---|---|---|---|
| 475° F. | 11.0 | 12.1 | 14.5 | 16.5 | 13.0 |
| 500° F. | 10.3 | 11.4 | 15.3 | 15.1 | 13.4 |
| 525° F. | 9.7 | 10.6 | 11.9 | 12.4 | 13.5 |

[1] Merlon M-40.
[2] A blend of graft polymer toughner and SAN at a ratio of 2.0/1.5 (toughner/SAN). The composition of the components is the same as noted above in Example 1.
[3] Bulk polymerized ABS resin from Dow Chemical Company, Dow 213.
[4] See note 3 in Example 1.
[5] AC 540 from Allied Chemical Company.

EXAMPLE 5

Compositions according to the invention were prepared and their properties evaluated as shown below. Blending and extrusion were carried out as was described above except that the temperature of extrusion was (from rear to front profile): 260/255/250/235/225/240/240° C.

|  | 5-1 | 5-2 | 5-3 | 5-4 |
|---|---|---|---|---|
| Polycarbonate[1], pbw | 50 | 50 | 40 | 40 |
| ABS[2] pbw | 50 | 50 | 60 | 60 |
| Ethylene-acrylic acid copolymer[3], phr | — | 2.75 | — | 2.75 |
| Melt index gm/min. | 1.86 | 1.06 | .86 | .51 |
| Tensile strength |  |  |  |  |
| Yield | 47 | 48.1 | 42.6 | 40.8 |
| Failure | 40.5 | 43.9 | 36.2 | 34.8 |
| Elongation, % | 88.3 | 89 | 59.3 | 98.3 |
| Heat distortion temp. at 264 psi, °C. | 110.4 | 109.7 | 105.6 | 103.0 |
| Impact strength, lb-ft/in. ⅛" notched Izod, molded at |  |  |  |  |
| 450° F. | 11.7 | 20.8 | 10.4 | 17.6 |
| 475° F. | 11.1 | 25.3 | 9.9 | 14.9 |
| 500° F. | 9.4 | 18.3 | 8.7 | 11.0 |
| 525° F. | 8.3 | 11.3 | 7.2 | 7.9 |

[1] Merlon M-50.
[2] A blend of a graft polymer toughner and SAN, see Note 2 of Example 1, the ratio of SAN/toughner in Examples 1 and 2 is 1.75/3.25, for Examples 3 and 4 it is 2.1/3.9 and for Examples 5 and 6 it is 2.45/4.55.
[3] AC 540 from Allied Chemical Company.

EXAMPLE 6

Compositions according to the invention were prepared and their properties determined as shown below. Blending and extrusion were carried out as described above in Example 1. The compositions all contained Merlon M-40 polycarbonate (60% by weight) and ABS (40% by weight). The ABS was a blend of a graft polymer toughner and SAN as described above and the ratio SAN/toughner was 1.4/1.6. The acidifying agent—Allied AC 540-A, an ethylene acrylic copolymer—was added as indicated:

|  | Control | 6-1 | 6-2 | 6-3 |
|---|---|---|---|---|
| Acrylic copolymer, phr | — | 2.2 | 3.3 | 4.4 |
| Tensile properties: |  |  |  |  |
| Yield | 47.5 | 49 | 49.5 | 48 |
| Failure | 40.6 | 47.1 | 44.5 | 40.4 |
| Elongation | 59.3 | 116 | 110 | 95 |
| Impact strength, ft-lb/in., ⅛" notched Izod specimens molded at |  |  |  |  |
| 450° F. | 11.8 | 12.7 | 13.1 | 13.4 |
| 475° F. | 10.4 | 11.9 | 12.15 | 12.5 |
| 500° F. | 8.1 | 11.6 | 11.7 | 16.3 |
| 525° F. | 7.7 | 10.0 | 10.3 | 11.8 |

EXAMPLE 7

Compositions according to the invention were prepared and their properties determined as shown below. Blending and extrusion were carried out as described in Example 6 except that the polycarbonate used was Merlon M-50. The temperature profile (rear to front) upon extrusion was 270/280/270/255/245/265/265. The acidifying agent—ethyleneacrylic copolymer (Allied Chemical AC 540-A) was added as indicated:

|  | 7-1 | 7-2 | 7-3 |
|---|---|---|---|
| Copolymer added, phr | 1.1 | 2.2 | 3.3 |
| Melt index gm/10 min. | — | 1.25 | — |
| Heat Distortion temp. °C. | 113.1— 105.6 | 119.3— 113 | 114— 111.8 |
| Tensile Properties, MPa |  |  |  |
| Yield | 47.7 | 47.7 | 46.9 |
| Failure | 43.6 | 47.8 | 14.2 |
| Elongation % | 98.3 | 105 | 61.7 |
| Impact strength, ⅛" Izod ft-lb/in. for specimens molded at |  |  |  |
| 450° F. | 13.3 | 16.3 | 20.3 |
| 475° F. | 11.7 | 12.5 | 14.1 |
| 500° F. | 10.8 | 12.5 | 12.8 |
| 525° F. | 10.2 | 12.9 | 13.4 |

EXAMPLE 8

Compositions according to the invention were prepared and their properties determined as described below. Blending and extrusion were carried out in accordance with the procedure outlined in Example 7, except that Merlon M-50 was the polycarbonate used for Examples 8-1, 8-2 and 8-3 and Merlon M-40 was used for Example 8-4. The acidifying agent—a styrene/maleic anhydride copolymer, DylarK 238 was added as indicated.

|  | 8-1 | 8-2 | 8-3 | 8-4 |
|---|---|---|---|---|
| Copolymer added, phr | 1.1 | 2.2 | 3.3 | 2.2 |
| Melt index, gm/10 min. | 2.2 | 1.85 | 1.92 | 2.09 |
| Heat Distortion Temperature °C. | 112.8 | 112.3 | 117.8 | 117.1 |
| Impact strength, ft-lb/in. notched Izod ⅛" specimens, molded at |  |  |  |  |
| 450° F. | 11.6 | 12.0 | 12.1 | 12.2 |
| 475° F. | 11.6 | 10.9 | 11.9 | 11.3 |
| 500° F. | 10.9 | 11.4 | 11.2 | 10.3 |
| 525° F. | 10.7 | 10.9 | 10.6 | 10.1 |
| ¼" specimens, molded |  |  |  |  |
| 450° F. | 9.7 | 9.45 | 9.3 | 9.3 |
| 525° F. | 7.9 | 7.9 | 7.4 | 6.7 |

EXAMPLE 9

Compositions in accordance with the invention were prepared and the properties determined as shown below. All the compositions consisted of 60% by weight of Merlon M-50 polycarbonate and 40% by weight of a graft polymer ABS resin as described in Example 6. Temperature profile upon extrusion was as in Example 7. The acidifying agent—methylmethacrylate/acrylic acid copolymer—containing about 10% acid, was added as indicated below.

|  | 9-1 | 9-2 | 9-3 | 9-4 |
| --- | --- | --- | --- | --- |
| Added copolymer, phr | — | 0.55 | 1.10 | 1.65 |
| Melt index | 3.18 | — | — | 0.94 |
| HDT, °C. | 106.8 | 114.1 | 119.5 | 113.3 |
| Tensile Properties | | | | |
| Yield, MPa | 48.7 | 49.3 | 50.4 | 50.2 |
| Failure, MPa | 41 | 42.7 | 49.1 | 36.7 |
| Elongation, % | 45 | 54 | 100.7 | 88.7 |
| Impact strength, ⅛" notched Izod ft. lb/in. specimens molded at | | | | |
| 450° F. | 11.1 | 12.1 | 15.2 | 17.1 |
| 475° F. | 10.6 | 12.1 | 12.1 | 12.4 |
| 500° F. | 10.4 | 11.2 | 12.1 | 12.5 |
| 525° F. | 9.1 | 10.9 | 12.0 | 12.8 |
| ¼" notched Izod specimens molded at 450° F. | 8.2 | 10.3 | 10.5 | 10.9 |

EXAMPLE 10

Compositions in accordance with the invention were prepared and their properties determined as shown below. The components were tumble blended and the blend extruded (2" mpm, 2.71:1, screw screen pack) at a temperature profile (r→f) 270, 280, 270, 255, 245, 260, 265° C.

|  | 10-1 | 10-2 | 10-3 | 10-4 |
| --- | --- | --- | --- | --- |
| Polycarbonate[1], pbw | 60.0 | 60.0 | 45.0 | 45.0 |
| ABS[2], pbw | 38.0 | 38.0 | 53.0 | 53.0 |
| Phosphite stabilizer[3] phr | — | 0.33 | — | 0.33 |
| Acidifying agent[4], phr | — | 2.2 | — | 2.2 |
| Melt index gm/10 min. | 12.8 | 5.23 | 11.3 | 4.22 |
| Impact strength, ⅛" notched Izod (ft-lb/in) specimens molded at | | | | |
| 450° F. | 9.9 | 10.8 | 9.0 | 9.7 |
| 475° F. | 9.2 | 10.4 | 8.7 | 9.4 |
| 500° F. | 7.8 | 10.3 | 7.5 | 8.8 |
| 525° F. | 7.3 | 10.1 | 7.6 | 8.1 |

[1]Merlon M-40.
[2]A blend of styrene (72%) acrylonitrile (28) (SAN) and a graft polymer-ABS toughner. The toughner comprises 50 pbw of SAN grafted on polybutadiene 50 pbw. The weight ratio of the SAN to the toughner is 1.4/2.4 in samples 10-1 and 10-2 and 2.0/3.3 for 10-3 and 10-4.
[3]A stabilizer in accordance with DOS 2,929,229.
[4]A copolymer of methacrylic acid (30%) and styrene (70%).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a blend of
   (a) a polycarbonate resin
   (b) a brine coagulated emulsion polymerization product of a vinyl aromatic monomer and at least one member selected from the group consisting of acrylic ester monomers and acrylonitrile monomers in the presence of a polybutadiene rubber graft base and
   (c) a polymeric acidifying agent said composition further characterized in that said (c) is present in an amount of between 0.1 and about 15.0% relative to the weight of said (a) plus said (b).

2. The composition of claim 1 wherein said (a) relates to said (b) by weight as from 5:95 to about 95:5.

3. The composition of claim 1 wherein said (c) is selected from the group consisting of polymers and copolymers that contain from about 0.1 to about 30.0 percent of any of carboxylic acid, phosphoric acid and sulfuric acid moieties, same percent being relative to the weight of said (c).

4. The composition of claim 3 wherein said copolymers are selected from the group consisting of ethylene/acrylic acid, ethylene/methacrylic acid, styrene/acrylic acid, styrene/methacrylic acid, methylmethacrylate/acrylic acid.

5. The composition of claim 1 wherein said (b) is characterized in that its graft base is selected from the group consisting of polybutadiene, butadiene/acrylonitrile and butadiene/styrene acrylic ester/vinyl ether.

6. A thermoplastic molding composition comprising a blend of
   (a) a polycarbonate resin
   (b) a brine coagulated emulsion polymerization product of a vinyl aromatic monomer and at least one member selected from the group consisting of acrylic ester monomers and acrylonitrile monomers in the presence of a polybutadiene rubber graft base and
   (c) an ethylene/acrylic acid copolymer said composition further characterized in that said (c) is present in an amount of between 0.1 and about 15.0% relative to the weight of said (a) plus said (b).

* * * * *